(12) United States Patent
Suzuki

(10) Patent No.: US 11,081,854 B2
(45) Date of Patent: Aug. 3, 2021

(54) LASER OSCILLATOR MONITORING CONTROL SYSTEM

(71) Applicant: FANUC CORPORATION, Tamanashi (JP)

(72) Inventor: Tatsuya Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 54 days.

(21) Appl. No.: 16/598,944

(22) Filed: Oct. 10, 2019

(65) Prior Publication Data

US 2020/0119515 A1   Apr. 16, 2020

(30) Foreign Application Priority Data

Oct. 12, 2018  (JP) .............................. JP2018-193255

(51) Int. Cl.
  *H01S 3/13*  (2006.01)
  *H01S 3/131*  (2006.01)
  *H01S 3/067*  (2006.01)

(52) U.S. Cl.
  CPC ............ *H01S 3/1305* (2013.01); *H01S 3/067* (2013.01); *H01S 3/1312* (2013.01)

(58) Field of Classification Search
  CPC ...... H01S 3/1305; H01S 3/067; H01S 3/1312; H01S 3/23; H01S 3/0014; H01S 3/10;
  (Continued)

(56) References Cited

U.S. PATENT DOCUMENTS

| 2003/0161379 A1* | 8/2003 | Wolak ...................... H01S 5/147 372/108 |
| 2005/0115940 A1* | 6/2005 | Matsushita ........... G01J 1/4257 219/121.83 |

(Continued)

FOREIGN PATENT DOCUMENTS

| JP | H03-012144 A | 1/1991 |
| JP | 2005-161361 A | 6/2005 |

(Continued)

OTHER PUBLICATIONS

An Office Action; "Notice of Reasons for Refusal", mailed by the Japanese Patent Office dated Sep. 1, 2020, which corresponds to Japanese Patent Application No. 2018-193255 and is related to U.S. Appl. No. 16/598,944; with English language translation.

*Primary Examiner* — Xinning(Tom) Niu
(74) *Attorney, Agent, or Firm* — Studebaker & Brackett PC

(57) ABSTRACT

A laser oscillator capable of detecting scattered light intensity when a laser beam is incident on an end surface of a fiber more appropriately is provided. A laser oscillator monitoring control system includes: a scattered light detection unit that detects a scattered light intensity on an input end surface of a process fiber of a fiber laser oscillator; a control unit that controls a laser output value on the basis of a laser output command value from a CNC and a detection result obtained by the scattered light detection unit; a normal scattered light calculation unit that calculates a normal index value; a first threshold setting unit that sets a first threshold indicating an abnormality resulting from a contamination and/or a scratch; a second threshold setting unit that sets a second threshold indicating an abnormality resulting from an optical axis shift; and a third threshold setting unit that sets a third threshold indicating an abnormality of a level in which a component is destroyed. The control unit controls a laser (Continued)

output value on the basis of the scattered light intensity detected by the scattered light detection unit, the first threshold, the second threshold, and the third threshold.

7 Claims, 7 Drawing Sheets

(58) Field of Classification Search
CPC .. B23K 31/12; B23K 26/705; B23K 26/0604; B23K 26/707; G02B 6/4296; G01N 21/47
See application file for complete search history.

(56) References Cited

U.S. PATENT DOCUMENTS

| | | | | |
|---|---|---|---|---|
| 2009/0310628 | A1* | 12/2009 | Yamazaki | H01S 3/067 372/6 |
| 2019/0260175 | A1* | 8/2019 | Peng | G01M 11/30 |
| 2019/0296515 | A1* | 9/2019 | Yokoyama | G01J 1/4257 |

FOREIGN PATENT DOCUMENTS

| | | |
|---|---|---|
| JP | 2006-324557 A | 11/2006 |
| JP | 2008-114228 A | 5/2008 |
| JP | 2010-219164 A | 9/2010 |
| JP | 2017-191833 A | 10/2017 |

* cited by examiner

NORMAL STATE

ATTACHMENT OF DUST OR WATER DROP

OPTICAL AXIS SHIFT

LASER OSCILLATOR MONITORING CONTROL SYSTEM

This application is based on and claims the benefit of priority from Japanese Patent Application No. 2018-193255, filed on 12 Oct. 2018, the content of which is incorporated herein by reference.

BACKGROUND OF THE INVENTION

Field of the Invention

The present invention relates a laser oscillator monitoring control system.

Related Art

Conventionally, fiber laser oscillators (laser oscillators) are frequently used in machine tools and the like due to many advantages such as high energy conversion efficiency, high output power, and easy maintenance.

For example, as illustrated in FIG. 5, a laser oscillator A of this type includes a power supply 1, a laser cavity (LC) 2 including an optical fiber as a laser medium, an excitation source, and a resonant mirror, a beam combiner 4 that welds a plurality of optical fibers guiding a laser beam from the laser cavity 2 to one feed fiber 3 to output a high-power laser beam, and a fiber-diameter-conversion coupler 7 that guides a laser beam guided from the beam combiner 4 to a machining head 6 via a process fiber 5 or a laser-beam-distribution beam splitter 8 that guides the laser beam guided from the beam combiner 4 to a plurality of machining heads 6.

In the fiber laser oscillator A of a machine tool or the like, a current value of the power supply 1, the power in the laser cavity 2, and the power in the beam combiner 4 are detected, and a computer numerical controller (CNC) 9 performs control while monitoring whether respective device units operate according to command values (for example, see Patent Document 1). Moreover, in a portion of the coupler 7 or the beam splitter 8 where a laser beam is incident on an input end surface of the process fiber 5, as illustrated in FIG. 6, scattered light intensity is monitored by a photodiode (PD) 10 to detect an abnormality, and control such as stopping of laser oscillation is performed. In FIG. 6, reference numerals 11 and 12 are lenses.

Patent Document 1: Japanese Unexamined Patent Application (Translation of PCT Application), Publication No. 2005-161361

SUMMARY OF THE INVENTION

On the other hand, as is well known, as illustrated in FIG. 7, the optical fiber 5 is formed in a three-layer structure including a core 13 of an axis, a cladding 14, and a coating 15. In a portion of the coupler 7 or the beam splitter 8 where a laser beam is incident on an input end surface of the process fiber 5, a focal point is formed on the lens 12 (11) to emit a laser beam to the core 13 at the input end surface of the fiber.

In the portion of the coupler 7 or the beam splitter 8 where a laser beam is incident on an input end surface of the fiber, as illustrated in FIGS. 5 to 7, scattered light intensity is detected by the photodiode 10, and the CNC 9 performs control of stopping laser oscillation when abnormal scattered light intensity is detected.

Specifically, as illustrated in FIG. 7, when an abnormality such as attachment of dust or a water drop (dew), contamination due to drying, or a scratch is present on an end surface of a fiber, the scattered light intensity detected by the photodiode 10 increases. When an optical axis is shifted, the scattered light intensity decreases. It is also known that, when an abnormality such as contamination or a scratch is present on a mirror of the beam splitter 8, the scattered light intensity increases, and cleaning or the like is required.

Therefore, in the portion of the coupler 7 or the beam splitter 8 where a laser beam is incident on an end surface of the fiber, the scattered light intensity is detected by the photodiode 10. As illustrated in FIG. 8, when a scattered light intensity larger than a predetermined upper limit threshold (an alarm threshold) is detected, it is determined that a contamination or a scratch is present on the end surface of the fiber, an alarm (warning) is output and laser oscillation is stopped.

However, in the conventional method, even when a contamination or a scratch is present on the end surface of a fiber, a laser beam having the rated output as in the command is emitted. When the scattered light intensity in that state deviates from the range of the upper limit alarm threshold, it is determined that an abnormality has occurred and laser radiation is stopped. Therefore, since a laser beam having the rated output corresponding to a command value is input to the end surface of the fiber even if a contamination due to dust or the like is present on the end surface of the fiber, the dust or the like may burn and the end surface of the fiber may be destroyed (damaged).

Since a laser beam having the rated output is radiated even when the optical axis is shifted, a laser beam having a predetermined intensity may not be emitted from the machining head, and the laser beam may be radiated to an unexpected portion (component) to destroy (damage) the component, thus causing a great damage.

That is, in the conventional method, since an alarm threshold is set for a damage level of a component such as the end surface of a fiber, an abnormality cannot be detected in a lower power state of a laser beam. Due to this, even when laser radiation is stopped upon detecting an abnormality, a damage may occur in the component.

As illustrated in FIG. 8, in the conventional method, when the optical axis is shifted and scattered light intensity decreases, there is a case where scattered light is not detected although the intensity exceeds an alarm level. Moreover, there is also a case where a contamination is not detected in a low-power state of the laser beam and an abnormality is not detected although the contamination is present on the end surface of the fiber.

On the other hand, the detected scattered light intensity of the photodiode 10 changes depending on a variation in characteristics of the photodiode itself, a minute difference (a minute difference in angle and position) in a mounting position, and the like. Due to this, it is necessary to perform adjustment and calibration of intensity after mounting, and a lot of time and effort is required during shipping, maintenance and replacement, or manufacturing of the laser oscillator of which the intensity is adjusted and calibrated. Therefore, there is a strong demand for developing a method capable of reducing the time and effort of performing adjustment and calibration of the intensity of the laser oscillator.

The present invention has been made in view of the above-described problems, and an object thereof is to provide a laser oscillator monitoring control system capable of preventing destruction (damage) of components such as an optical fiber and enabling intensity adjustment and calibration to be performed efficiently during shipping, maintenance and replacement, or manufacturing of a laser oscillator.

The present inventor has found means capable of preventing destruction (damage) of components such as an optical fiber and enabling intensity adjustment and calibration to be performed efficiently during shipping, maintenance and replacement, or manufacturing of a laser oscillator and has completed the invention.

(1) The present invention provides a laser oscillator monitoring control system including: a scattered light detection unit (for example, a scattered light detection unit 20 and a photodiode 10 to be described later) that detects a scattered light intensity on an input end surface of a process fiber (for example, a process fiber 5 to be described later) of a fiber laser oscillator (for example, a laser oscillator A to be described later); a control unit (for example, a control unit 21 to be described later) that controls a laser output value on the basis of a laser output command value from a computer numerical controller (for example, a CNC 9 to be described later) and a detection result obtained by the scattered light detection unit; a normal scattered light calculation unit (for example, a normal scattered light calculation unit 22 to be described later) that calculates a normal index value (for example, a normal index value S1 to be described later) indicating a relation between the laser output command value and the scattered light intensity in a normal state; a first threshold setting unit (for example, a first threshold setting unit 23 to be described later) that sets a first threshold (for example, a first threshold S2 to be described later) indicating a relation between the laser output command value and the scattered light intensity in an abnormal state resulting from a contamination and/or a scratch; a second threshold setting unit (for example, a second threshold setting unit 24 to be described later) that sets a second threshold (for example, a second threshold S3 to be described later) indicating a relation between the laser output command value and the scattered light intensity in an abnormal state resulting from an optical axis shift; and a third threshold setting unit (for example, a third threshold setting unit 25 to be described later) that sets a third threshold (for example, a third threshold S4 to be described later) indicating the scattered light intensity in an abnormal state of a level in which a component is destroyed, wherein the control unit controls a laser output value on the basis of the scattered light intensity detected by the scattered light detection unit, the first threshold, the second threshold, and the third threshold.

(2) The invention of (1) may further include: a warning unit (for example, a warning unit 26 to be described later) that issues a warning when the scattered light intensity exceeding the first threshold is detected, when the scattered light intensity lower than the second threshold is detected, and when the scattered light intensity reaching the third threshold is detected.

(3) In the invention of (1) or (2), the first threshold setting unit may set the first threshold by adding a scattered light intensity value which is a first positive constant to the scattered light intensity of the normal index value, and the second threshold setting unit may set the second threshold by subtracting a scattered light intensity value which is a second positive constant from the scattered light intensity of the normal index value.

(4) In the invention of (1) or (2), in a relation between the laser output command value and the scattered light intensity, when the scattered light intensity of the normal index value is $S(P_1)$, the laser output command value is $P_C$, and a1, a2, b1, and b2 are positive constants, the first threshold setting unit may set the first threshold as $S(P_C)+(a1\times S(P_c)+b1)$, and the second threshold setting unit may set the second threshold as $S(P_C)-(a2\times(S(P_c)+b2))$.

(5) The invention of any one of (1) to (4) may further include: a laser output suppression unit that lowers a clamp command value M1 of the maximum laser output command value to a clamp command value M2 calculated as $P_{CF}\times$ (the third threshold)/$S(P_{CF})$ with a warning when the scattered light intensity exceeds the first threshold where the scattered light intensity upon reaching the first threshold is $S(P_{CF})$ and the laser output command value upon reaching the first threshold is $P_{CF}$ in a relation between the laser output command value and the scattered light intensity.

(6) In the invention of any one of (1) to (5), in a relation between the laser output command value and the scattered light intensity, the third threshold may be set to be identical to the first threshold at a rated maximum laser output command value ($P_{CM}$).

(7) In the invention of (5) or (6), the clamp command value M1 may be set to a rated maximum laser output command value ($P_{CM}$).

According to the present invention, it is possible to prevent destruction of components such as an optical fiber and perform intensity adjustment and calibration efficiently during shipping, maintenance and replacement, or manufacturing of a laser oscillator.

DETAILED DESCRIPTION OF THE INVENTION

Hereinafter, a monitoring control system of a laser oscillator according to an embodiment of the present invention will be described with reference to FIGS. 1 to 4.

Figure 1:
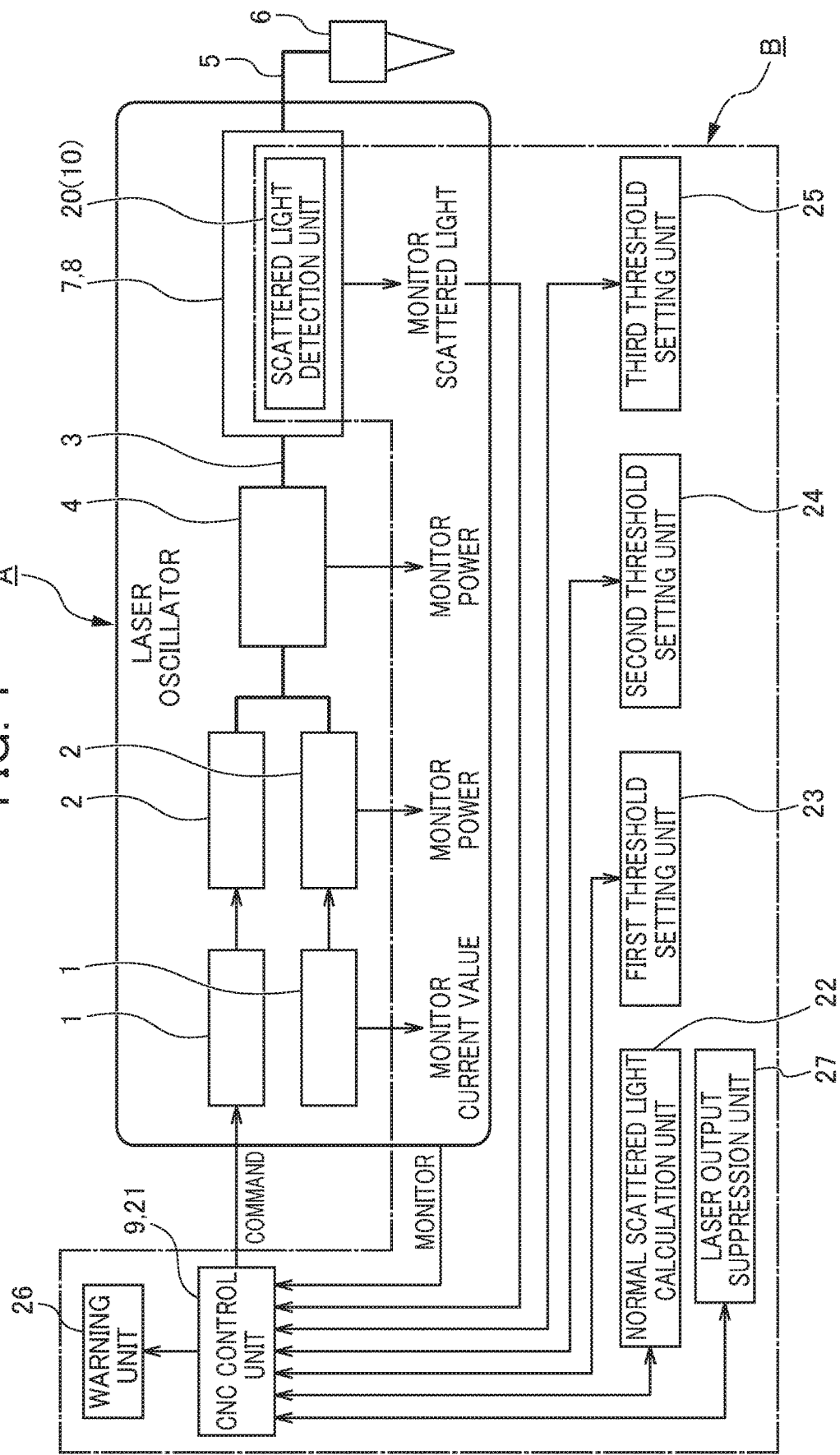
FIG. 1 is a diagram illustrating a laser oscillator according to an embodiment of the present invention and a monitoring control system of the laser oscillator.

A laser oscillator A of the present embodiment is a fiber laser oscillator. For example, as illustrated in FIG. 1, the laser oscillator A includes a power supply 1, a laser cavity (LC) 2 including an optical fiber as a laser medium to which electric power from the power supply 1 is supplied and which oscillates a laser beam, an excitation source such as a semiconductor laser, and a resonant mirror, a beam combiner 4 that welds a plurality of optical fibers guiding a laser beam from the laser cavity 2 to one feed fiber 3 to output a high-power laser beam, and a fiber-diameter-conversion coupler 7 or a laser-beam-distribution beam splitter 8 that guides a laser beam guided from the beam combiner 4 to a machining head 6 via a process fiber 5.

Moreover, the laser oscillator A of the present embodiment includes a laser oscillator monitoring control system B that detects abnormalities in the laser oscillator by detecting a current value of the power supply 1, the power in the laser cavity 2, and the power in the beam combiner 4 to monitor whether respective device units operate according to the command values from a computer numerical controller (CNC) 9 and monitoring the scattered light intensity with the aid of a photodiode (PD) 10 in a portion of the coupler 7 or the beam splitter 8 in which a laser beam is incident on an end surface (an input end surface of the process fiber 5) of the fiber.

A laser oscillator monitoring control system B includes a scattered light detection unit 20 that directly or indirectly detects an output value of a laser beam guided from the coupler 7 or the beam splitter 8 to the process fiber 5 and a control unit 21 that controls a laser output value on the basis of the laser output command value from the CNC 9 and performs control of stopping the output of the laser beam on the basis of a detection result obtained by the scattered light detection unit 20.

The scattered light detection unit 20 of the present embodiment is the photodiode 10 and detects a scattered light (scattered light intensity) in a portion of the coupler 7 or the beam splitter 8 in which a laser beam is incident on the end surface of the fiber. In other words, the scattered light detection unit 20 of the photodiode 10 indirectly detects an output value of a laser beam guided from the coupler 7 or the beam splitter 8 to the process fiber 5.

As in the present embodiment, when a photodiode is used as the scattered light detection unit 20, the photodiode 10 which has conventionally been provided for alignment of an optical axis can be used as the scattered light detection unit 20. Moreover, in the present embodiment, the CNC 9 is used as the control unit 21 of the laser oscillator monitoring control system B.

Moreover, the laser oscillator monitoring control system B includes a normal scattered light calculation unit 22 that calculates a normal scattered light intensity with respect to a laser output command (a laser output command value) from the CNC 9, a first threshold setting unit 23 that sets a first threshold of an upper limit of the scattered light intensity according to the laser output command from the CNC 9, a second threshold setting unit 24 that sets a second threshold of a lower limit of the scattered light intensity according to the laser output command value from the CNC 9, a third threshold setting unit 25 that sets a third threshold of an alarm value of the scattered light intensity which is a level that is not to be exceeded in any laser output value, and a warning unit 26 that issues a warning when the scattered light intensity exceeds the first threshold, is lower than the second threshold, or reaches the third threshold.

Furthermore, the laser oscillator monitoring control system B includes a laser output suppression unit 27 that forcibly suppresses a maximum laser output to a laser output lower than the laser output value (a maximum laser output command value, and beside this, may include a frequency, a duty command, and the like) from the CNC 9 to hold (clamp) the laser output so as not to exceed the third threshold when a scattered light intensity exceeding the first threshold is detected.

The normal scattered light calculation unit 22, the first threshold setting unit 23, the second threshold setting unit 24, the third threshold setting unit 25, and the laser output suppression unit 27 may be provided in the control unit 21 (in the present embodiment, the CNC 9).

Figure 2:
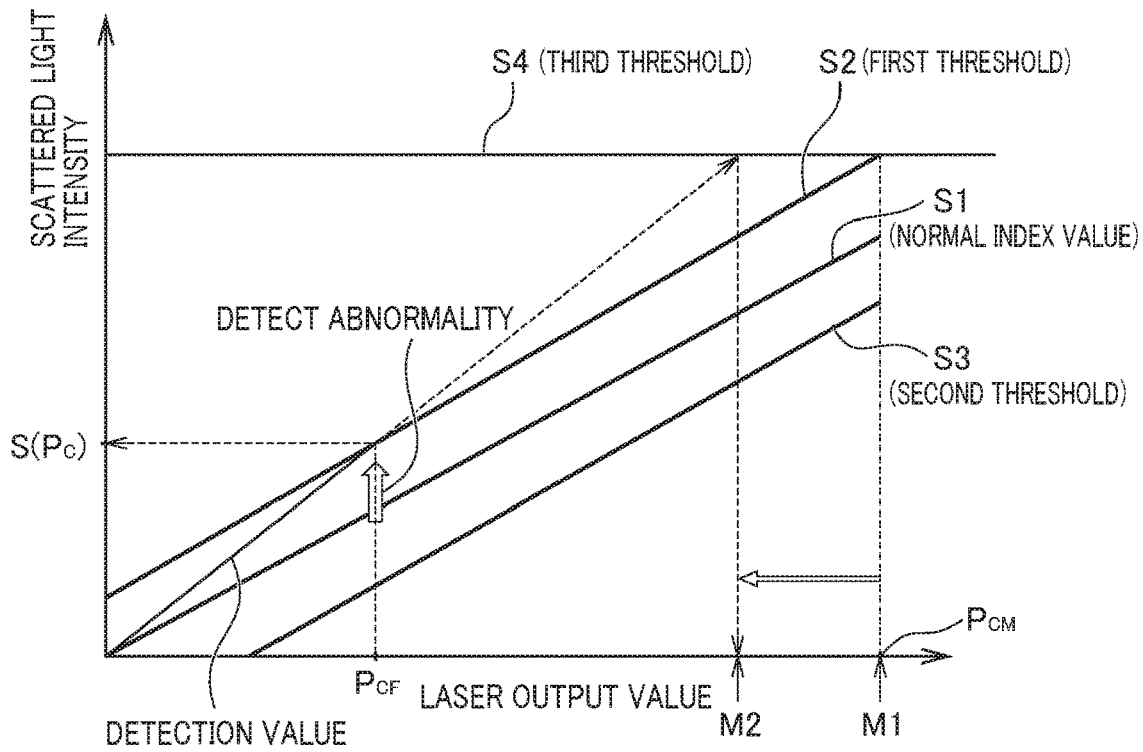
FIG. 2 is a diagram illustrating first, second, and third thresholds set by the monitoring control system of the laser oscillator according to the embodiment of the present invention.

When the laser oscillator A is to be monitored and controlled by the laser oscillator monitoring control system B of the present embodiment, the normal scattered light of the laser output value of the CNC 9 is automatically measured by the normal scattered light calculation unit 22 and the scattered light detection unit 20 of the photodiode 10, for example, and as illustrated in FIG. 2, a normal index value (a standard scattered light intensity) S1 of a normal relation between the laser output value and the scattered light intensity is calculated.

Subsequently, as illustrated in FIGS. 2 (and 1), the first threshold setting unit 23 determines a first threshold S2 obtained by adding a predetermined scattered light value (a scattered light intensity value which is a first positive constant) to the normal index value S1 of the normal relation between the laser output value and the scattered light intensity calculated by the normal scattered light calculation unit 22. The first threshold S2 is a value of a level in which a contamination or a scratch is present on the end surface of a fiber or a mirror of the beam splitter 8 and maintenance such as cleaning is required.

The second threshold setting unit 24 determines a second threshold S3 obtained by subtracting a predetermined scattered light value (a scattered light intensity value which is a second positive constant) from the normal index value S1 which is the normal relation between the laser output value and the scattered light intensity calculated by the normal scattered light calculation unit 22. The second threshold S3 is a value of a level in which an alignment due to an optical axis shift is required.

The third threshold setting unit 25 determines a third threshold S4 which is a fixed value calculated from a destruction (damage) level of a component such as an end surface of an optical fiber by correcting the measurement value of a normal scattered light. The third threshold S4 is a value of a level which is not to be exceeded in any laser output and in which a fiber or the like is destroyed.

In the laser oscillator monitoring control system B of the present embodiment, the control unit 21 automatically sets the normal index value S1 of the scattered light intensity and the alarm thresholds of the first, second, and third thresholds S2, S3, and S4 according to the laser output value from the CNC 9 during shipping, maintenance and replacement, or manufacturing of the laser oscillator A.

In this manner, by setting the three alarm thresholds of the first, second, and third thresholds S2, S3, and S4, when the scattered light intensity exceeds the first threshold S1 in a certain laser output command value, an alarm (warning) is emitted from the warning unit 26, a user can determine that a contamination or a scratch is present on a mirror or an end surface of a fiber and can recognize that cleaning or the like is required.

That is, when a contamination or a scratch is present on a mirror or an end surface of a fiber, a scattered light intensity exceeding the first threshold S2 is detected before a laser beam having the rated output is radiated to the end surface of the fiber.

In this way, in the laser oscillator monitoring control system B of the present embodiment, by setting the first threshold S2, it is possible to detect destruction (damage) before dust or the like on the end surface of the fiber burns and the end surface of the fiber is destroyed (damaged) and to prevent destruction of a component due to a contamination or the like.

In a stage in which a scattered light intensity exceeds the first threshold S2, since the risk that the component is destroyed immediately is low, it is possible to allow and prompt an operator to recognize the need to perform alignment adjustment or the like without stopping with an alarm and to reduce the downtime of laser machining.

Subsequently, when the detection value of the scattered light intensity is lower than the second threshold S3, an optical axis shift occurs, which is warned by the warning unit 26, and it can be determined that alignment is required. When the scattered light intensity is lower than the second threshold S3, since a radiation position of a laser beam is not clear, the laser oscillator A is stopped immediately with an alarm.

In this way, in the laser oscillator monitoring control system B of the present embodiment, by setting the second threshold S3, it is possible to detect an optical axis shift before a laser beam having the rated output is radiated and to prevent radiation of a laser beam to an unexpected portion (component) and occurrence of severe damage.

Subsequently, when the detection value of the scattered light intensity exceeds the third threshold S4, this is warned by the warning unit 26. Since the third threshold S4 is an alarm level that is not to be exceeded, the laser oscillator A is stopped immediately with an alarm.

Here, the laser oscillator monitoring control system B of the present embodiment includes the laser output suppression unit 27. Due to this, in a stage in which the scattered light intensity exceeds the first threshold S2, the laser output suppression unit 27 performs control of forcibly suppressing the laser output value, the frequency, the duty command, and the like output by the CNC 9 (the control unit 21) to hold (clamp) the laser output as necessary so that the scattered light intensity does not exceed the third threshold S4.

That is, as illustrated in FIG. 2, in the present embodiment, in the relation between the laser output command value and the scattered light intensity, when the scattered light intensity upon reaching the first threshold S2 is $S(P_{CF})$ and the laser output command value upon receiving the first threshold S2 is $P_{CF}$, in a case where the scattered light intensity exceeds the first threshold S2 in a certain laser output command value, a maximum laser output command is set to $P_{CF} \times$ (third threshold)$/S(P_{CF})$, and a clamp command value M1 of the maximum laser output command value is lowered to a clamp command value M2.

In this way, since the laser oscillator monitoring control system B of the present embodiment includes the laser output suppression unit 27, the output of the laser oscillator A is controlled to be within the clamp command value M2 and laser machining can be continued safely while reliably preventing destruction of a component. Therefore, it is possible to avoid unnecessary stop control of the laser oscillator A and to further reduce the downtime of laser machining.

Figure 3:
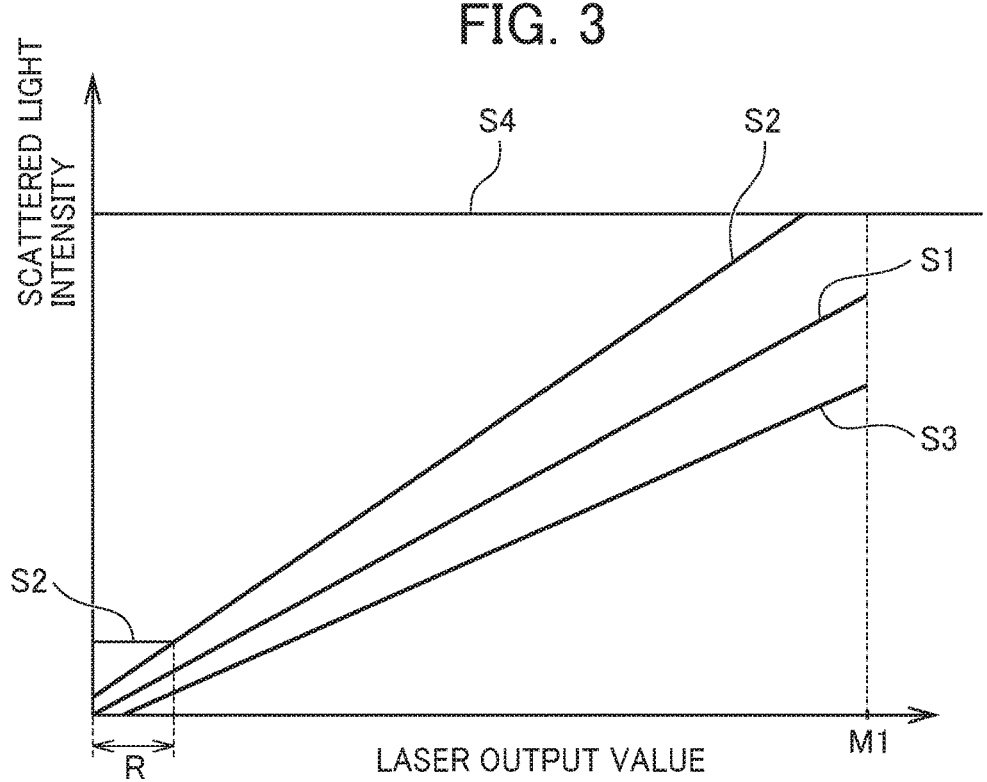
FIG. 3 is a diagram illustrating first, second, and third thresholds set by the monitoring control system of the laser oscillator according to the embodiment of the present invention.
Figure 4:
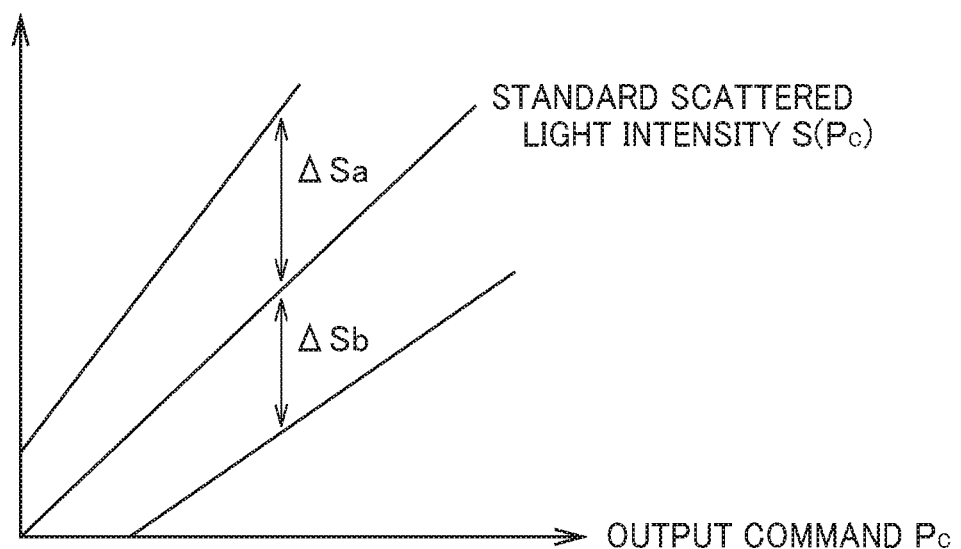
FIG. 4 is a diagram used for describing a method of setting the first and second thresholds of FIG. 3.
Figure 5:
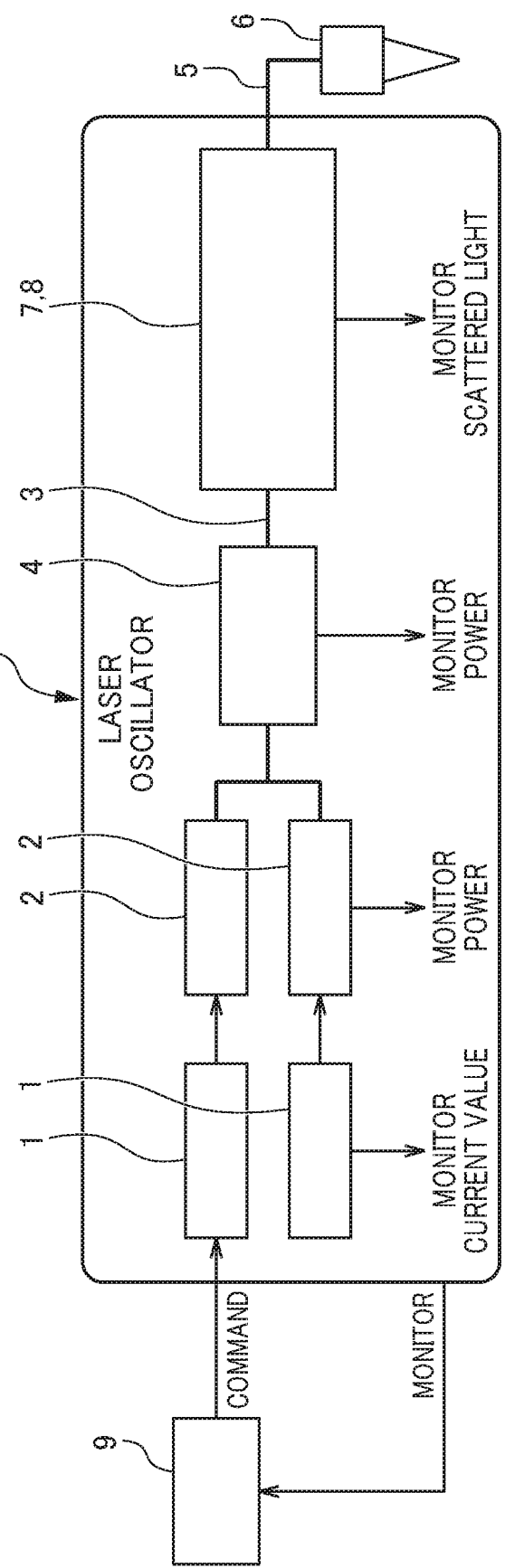
FIG. 5 is a diagram illustrating a laser oscillator.
Figure 6:
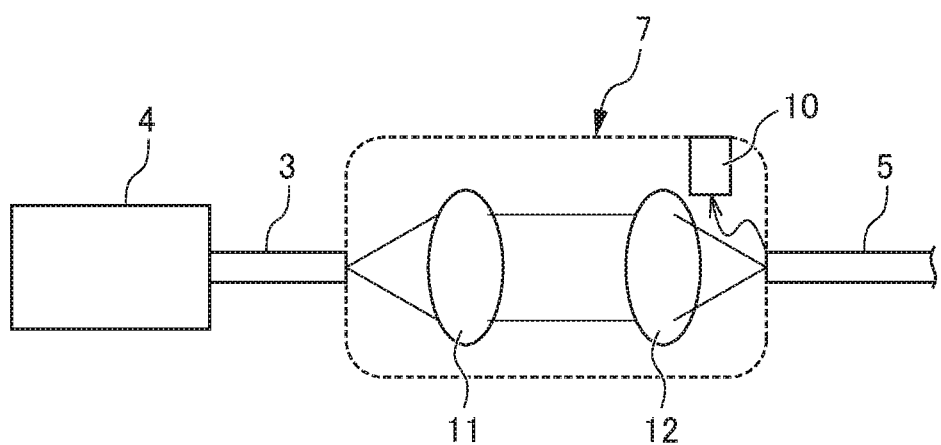
FIG. 6 is a diagram illustrating a state in which scattered light from an end surface of a process fiber connected by a coupler is detected by a photodiode.
Figure 7:
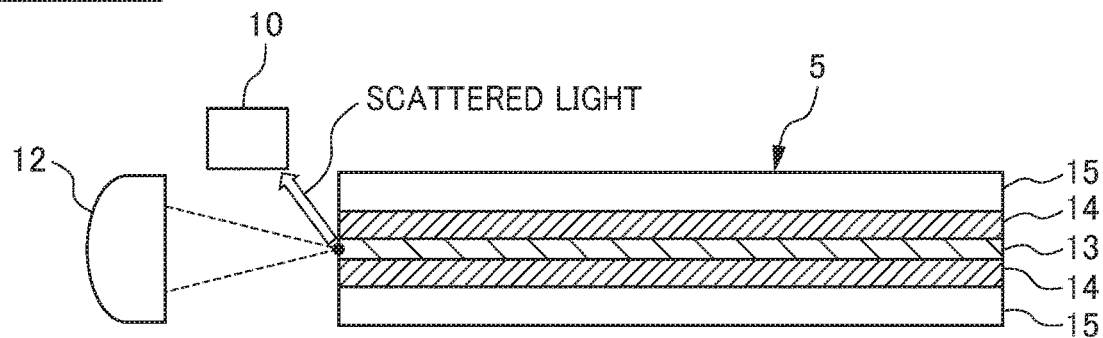
FIG. 7 is a diagram illustrate a state of scattered light from an end surface of a process fiber in a normal state, an abnormal state such as attachment of contamination, and an abnormal state such as an optical axis shift.
Figure 7:
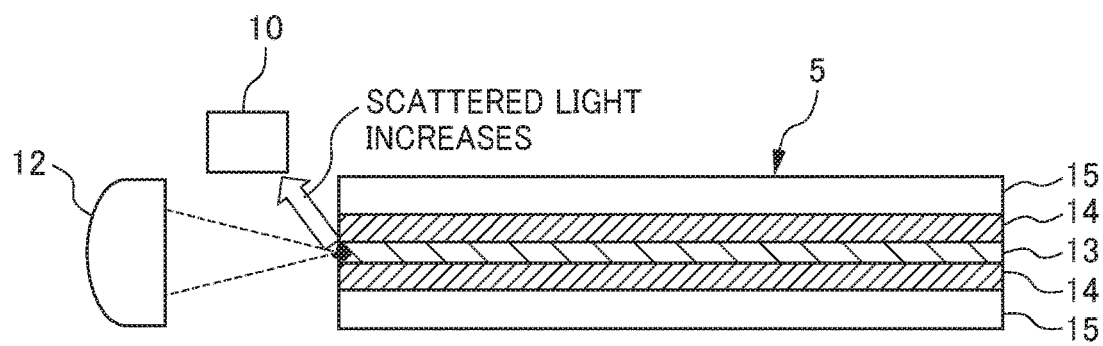
Figure 7:
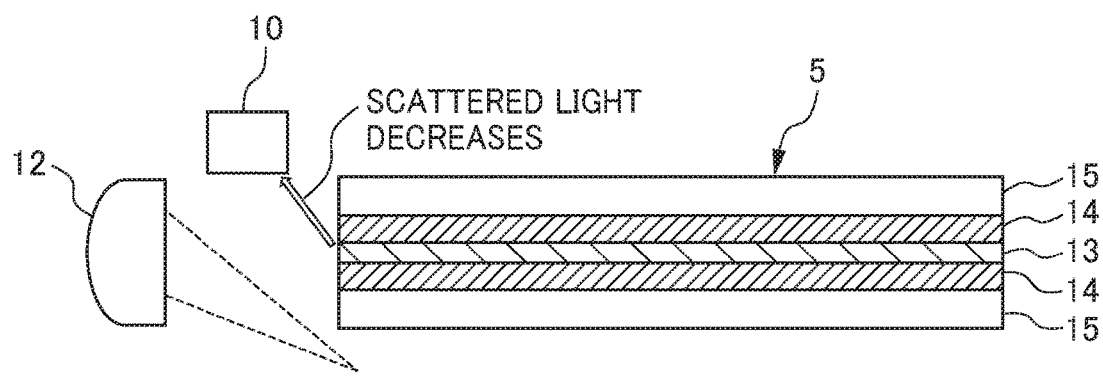
Figure 8:
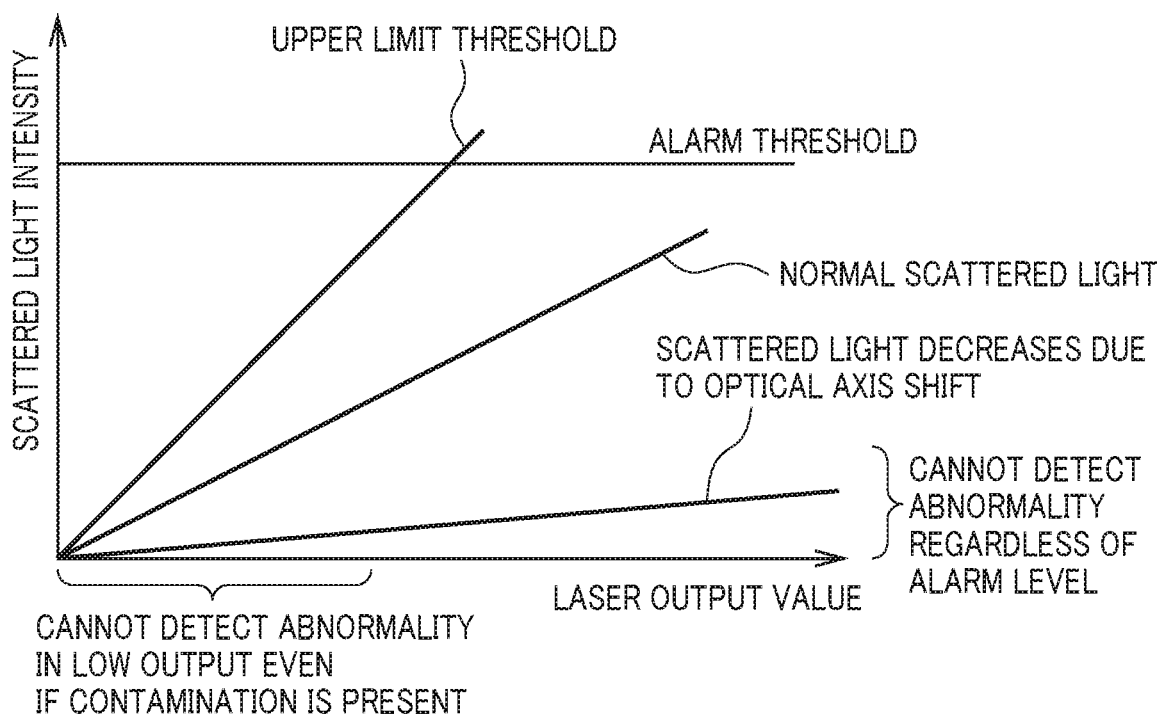
FIG. 8 is a diagram used for describing a method of monitoring and controlling scattered light intensity in a conventional laser oscillator.

Here, the smaller the laser output and the laser output command value, the smaller becomes a variation. Due to this, as illustrated in FIGS. 3 and 4, the first and second thresholds S2 and S3 may be set as a×(laser output value)+b. That is, a standard scattered light intensity (standard command value) ($S(P_C)$) is calculated in an initial state, and the first and second thresholds S2 and S3 may be set such that $\Delta Sa(P_C) = S(P_C) + (a1 \times P_C + b1)$, $\Delta Sb(P_C) = S(P_C) - (a2 \times P_C + b2)$, a1 and a2>0, and b1 and b2≥0.

In this manner, when the first and second thresholds S2 and S3 are set as illustrated in FIGS. 3 and 4, monitoring control of the laser oscillator A can be performed by setting the first threshold S2 by adding a certain fixed amount of scattered light intensity to the normal index value S1 illustrated in FIG. 2 and setting the second threshold S3 by subtracting a certain fixed amount of scattered light intensity from the normal index value S1.

Moreover, since the smaller the laser output (the laser output command value), the smaller becomes a variable thereof and a variable of the scattered light intensity, as illustrated in FIG. 3, it is preferable that the first threshold S2 is set to a constant value in a region R where the laser output is small. By setting the first threshold S2 to a constant value in this manner, it is possible to prevent the scattered light intensity from exceeding the first threshold S2 of the alarm threshold due to influence of noise and to perform monitoring control of the laser oscillator A more appropriately.

Therefore, according to the laser oscillator monitoring control system B of the present embodiment, by setting the first, second, and third thresholds S2, S3, and S4 and performing monitoring and control of the scattered light intensity, it is possible to prevent destruction of components while discriminating a minor state where cleaning or alignment is necessary from a severe state which may result in destruction of components to suppress downtime as much as possible.

In the laser oscillator monitoring control system B of the present embodiment, the CNC 9 (the control unit 21) can perform calibration automatically during shipping and replacement (and manufacturing) of units.

That is, since the laser oscillator monitoring control system B includes the control unit 21, the scattered light detection unit 20 (the photodiode 10), the normal scattered light calculation unit 22, the first threshold setting unit 23, the second threshold setting unit 24, and the third threshold setting unit 25, it is possible to automatically set the normal index value S1, the first threshold S2, the second threshold S3, and the third threshold S4 according to a variation in characteristics and a very small change in mounting position of the photodiode 10 of the scattered light detection unit 20. Therefore, it is possible to perform intensity adjustment and calibration efficiently without requiring a lot of time and effort unlike the conventional technology.

As in the present embodiment, since the photodiode 10 which has conventionally been provided to perform alignment of an optical axis is used as the scattered light detection unit 20, it is possible to realize the laser oscillator monitoring control system B which can perform monitoring and control with high accuracy and which is excellent in economy.

While an embodiment of the laser oscillator monitoring control system according to the present embodiment has been described, the present invention is not limited to the embodiment but can be changed appropriately without departing from the spirit thereof.

For example, as illustrated in FIG. 2, in the relation between the laser output command value and the scattered light intensity, the third threshold S4 may be set to be identical to the first threshold S2 of the rated maximum laser output command value ($P_{CM}$). Moreover, the clamp command value M1 may be set to the rated maximum laser output command value ($P_{CM}$). When the values are set in this manner, it is possible to prevent the scattered light intensity from exceeding the third threshold.

EXPLANATION OF REFERENCE NUMERALS

1: Power supply
2: Laser cavity (LC)
3: Feed fiber
4: Beam combiner
5: Process fiber
6: Machining head
7: Coupler
8: Beam splitter
9: CNC (Computer numerical controller)
10: Photodiode (Scattered light detection unit)
11: Lens
12: Lens
20: Scattered light detection unit
21: Control unit
22: Normal scattered light calculation unit
23: First threshold setting unit
24: Second threshold setting unit
25: Third threshold setting unit
26: Warning unit
27: Laser output suppression unit
A: Laser oscillator (Fiber laser oscillator)
B: Laser oscillator monitoring control system
S1: Normal index value
S2: First threshold
S3: Second threshold
S4: Third threshold

What is claimed is:

1. A laser oscillator monitoring control system comprising:
    a scattered light detection unit that detects a scattered light intensity on an input end surface of a process fiber of a fiber laser oscillator;
    a control unit that controls a laser output value on the basis of a laser output command value from a computer numerical controller and a detection result obtained by the scattered light detection unit;
    a normal scattered light calculation unit that calculates a normal index value indicating a relation between the laser output command value and the scattered light intensity in a normal state;
    a first threshold setting unit that sets a first threshold indicating a relation between the laser output command value and the scattered light intensity in an abnormal state resulting from a contamination and/or a scratch;
    a second threshold setting unit that sets a second threshold indicating a relation between the laser output command value and the scattered light intensity in an abnormal state resulting from an optical axis shift; and
    a third threshold setting unit that sets a third threshold indicating the scattered light intensity in an abnormal state of a level in which a component is destroyed, wherein
    the control unit controls a laser output value on the basis of the scattered light intensity detected by the scattered light detection unit, the first threshold, the second threshold, and the third threshold.

2. The laser oscillator monitoring control system according to claim 1, comprising:
    a warning unit that issues a warning when the scattered light intensity exceeding the first threshold is detected, when the scattered light intensity lower than the second threshold is detected, and when the scattered light intensity reaching the third threshold is detected.

3. The laser oscillator monitoring control system according to claim 1, wherein
    the first threshold setting unit sets the first threshold by adding a scattered light intensity value which is a first positive constant to the scattered light intensity of the normal index value, and
    the second threshold setting unit sets the second threshold by subtracting a scattered light intensity value which is a second positive constant from the scattered light intensity of the normal index value.

4. The laser oscillator monitoring control system according to claim 1, wherein
    in a relation between the laser output command value and the scattered light intensity, when the scattered light intensity of the normal index value is $S(P_C)$, the laser output command value is $P_C$, and $a1$, $a2$, $b1$, and $b2$ are positive constants,
    the first threshold setting unit sets the first threshold as $S(P_C)+(a1 \times S(P_C)+b1)$, and
    the second threshold setting unit sets the second threshold as $S(P_C)-(a2 \times (S(P_C)+b2)$.

5. The laser oscillator monitoring control system according to claim 1, comprising:
    a laser output suppression unit that lowers a clamp command value M1 of the maximum laser output command value to a clamp command value M2 calculated as $P_{CF} \times$ (the third threshold)/$S(P_{CF})$ with a warning when the scattered light intensity exceeds the first threshold where the scattered light intensity upon reaching the first threshold is $S(P_{CF})$ and the laser output command value upon reaching the first threshold is $P_{CF}$ in a relation between the laser output command value and the scattered light intensity.

6. The laser oscillator monitoring control system according to claim 1, wherein
    in a relation between the laser output command value and the scattered light intensity, the third threshold is set to be identical to the first threshold at a rated maximum laser output command value ($P_{CM}$).

7. The laser oscillator monitoring control system according to claim 5, wherein
    the clamp command value M1 is set to a rated maximum laser output command value ($P_{CM}$).

* * * * *